Feb. 6, 1951 A. H. PINKERMAN 2,540,908

LAMP ATTACHMENT FOR TELEPHONE INSTRUMENTS

Filed Nov. 20, 1947

Inventor

A. H. Pinkerman

By W. S. McDowell

Attorney

Patented Feb. 6, 1951

2,540,908

UNITED STATES PATENT OFFICE 2,540,908

LAMP ATTACHMENT FOR TELEPHONE INSTRUMENTS

Allen H. Pinkerman, Columbus, Ohio, assignor to Oakley Brooks, Columbus, Ohio

Application November 20, 1947, Serial No. 787,109

3 Claims. (Cl. 240—2.17)

This invention relates generally to lamps and, more specifically, to an improved lamp adapted for the purpose of illuminating the dials of standard cradle-type telephone instruments.

It is an object of the invention to provide a lamp adapted to produce efficient illumination of an associated telephone instrument, so that the dial portion particularly thereof may be readily viewed and actuated during periods of darkness.

It is another object of the invention to provide a lamp of this character which may be readily attached to an associated telephone instrument without requiring any change in the construction of the instrument in admitting of the securing of the lamp in connection therewith.

A further object is to provide a lamp which may be readily applied to or removed from an associated telephone instrument without involving the use of special tools in making the adaptations.

For a further understanding of the invention, reference is to be had to the following description and the accompanying drawing, wherein.

Figures 1, 2, 3:
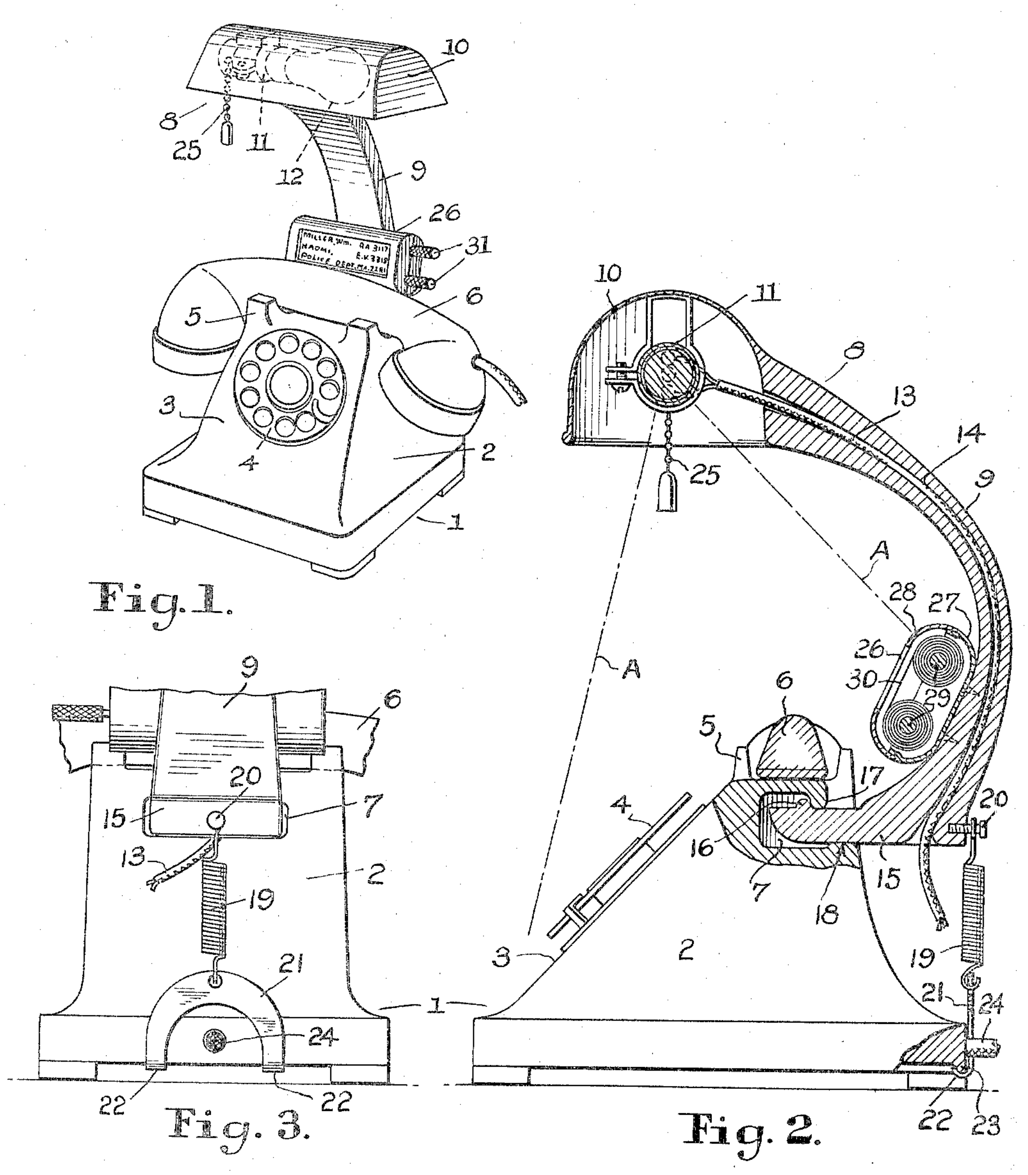
Fig. 1 is a perspective view of a telephone instrument disclosing the improved lamp comprising the present invention in association therewith.
Fig. 2 is a vertical sectional view taken through the lamp and through a portion of the telephone instrument, showing the construction of the lamp and the manner in which it is attached to the instrument.
Fig. 3 is a fragmentary rear elevation of the telephone instrument and associated portions of my improved lamp.
Figure 4:
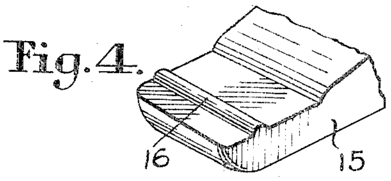
Fig. 4 is a detail perspective view of the laterally directed base tongue provided at the lower end of the curved standard of my improved lamp.

Referring more particularly to the drawings, the numeral 1 designates a telephone instrument of the cradle type which, as usual, comprises a housing 2 having a sloping front wall 3 on which is mounted a rotatable dialing switch 4. The top of the housing includes a cradle 5 for the reception of the usual combined type transmitter and receiver shown at 6. Below the cradle, the housing is formed with the customary finger-receiving socket or recess 7 by which the housing may be gripped and moved conveniently from place to place.

In association with such a telephone instrument, I provide a lamp which is designated in its entirety by the numeral 8. In this instance, the lamp is formed to provide a curved standard 9 formed preferably from one of the so-called plastics, although other suitable materials may be used. The standard is curved so that when the lamp is applied to the telephone instrument, an open-bottomed light reflector 10, formed with the upper end of the standard, will be disposed over but in spaced relation from the dialing switch 4 and the combined receiver and transmitter 6. Within the reflector, there is mounted a stationary socket 11 for the reception of a conventional incandescent lamp 12, constituting the light source. Light emanating from this source is directed downwardly by the reflector in a manner indicated by the broken lines A of Fig. 2. The socket 11 is joined with current conductors 13, which lead from the socket through a curved passage 14 provided in the standard 9 and extend to a suitable source of current supply, such as a conventional baseboard socket, not shown.

The lower end of the standard is formed with a laterally directed base tongue 15 and the forward portion of this tongue is adapted to be removably received in the socket or recess 7 of the instrument housing, the flat upper surface of the tongue being provided with a longitudinally extending rib 16, which has contact with a depending flange 17 formed at the top and rear of the socket 7. The lower surface of the base tongue rests on the surface 18 of the instrument housing and may be rocked thereon to engage or disengage the rib 16 with the flange 17. Positive engagement of the rib 16 with the flange 17 is also secured by the provision of a coil spring 19. The upper end of this spring has engagement with the shank of a screw 20 carried by the base 15 of the lamp standard at the rear thereof. The lower end of the spring carries a U-shaped bail 21, the lower ends of this bail having hook-shaped fingers 22 adapted to engage a depending bead 23 on the bottom edge of the instrument housing 2. The bail 21 is so shaped that it does not interfere with the usual current conductors 24 leading to the instrument.

By this construction, it will be evident that the lamp may be readily attached to the associated instrument by positioning the base tongue in the socket 7 thereof. In this operation, the rib 16 will clear the flange 17 by positioning the base tongue on the instrument surface 18 with the tongue in a slightly downwardly inclined position. Thereafter, the standard is rocked on the surface 18 to cause engagement of the rib with the inner surface of the flange 17. This engagement is positively maintained through the aid of the spring 19, so that accidental dislodgment of the lamp from its position of application is effectively precluded. It will be noted that in effecting this attachment or positioning of the lamp, no tools are necessary nor is any change made in the standard construction of the telephone instrument, it being a simple matter to insert the base tongue into the socket 7 and thereafter to effect hooked engagement of the bail 21 with the beaded edge 23 of the telephone base. When so attached, the spring is under some tension so that accidentally applied forces will not dislodge the lamp. The lamp socket 11 of the reflector 10 may be provided with a depending chain 25 for the operation of a standard switch in the socket used in controlling the energization of the incandescent lamp 8. In this instance, the reflector has been shown as being provided with a split clamping type bracket for use in the mounting of the lamp socket within the confines of the reflector.

Advantageously, an index 26 on which telephone numbers and addresses may be written may be applied to the lower portion of the lamp standard for the convenience of telephone users. The index includes a casing having a base section 27 and a removable and apertured cover section 28. In these sections, rotatable spools 29 are supported which carry a ribbon 30 on which the telephone addresses are written or otherwise applied. The spools may be rotated by the actuation of exteriorly projecting spool-shaft extensions 31.

Thus, the lamp comprising the present invention may be readily connected with or removed from standard cradle-type telephone instruments. In use, the lamp offers a great convenience to telephone users, since many telephones are located in relatively dark halls, closets or other places where it is difficult to see the numbering and lettering appearing on their dialing switches. The construction is essentially simple and may be produced at a relatively low cost. Due to the simplicity of its design, it will be understood that no expense is necessary on the part of one installing or removing the lamp.

I claim:

1. A detachable lamp for cradle-type telephone instruments of the kind having a base formed with a finger-receiving and lifting recess, said lamp comprising a standard extending from the back of the instrument base in an upward direction and terminating at the top thereof in a forwardly positioned open-bottomed reflector disposed above and in vertical alignment with the instrument base, electrically energized lighting means arranged in said reflector, a forwardly and laterally directed foot extending from the lower end of said standard into the finger-receiving recess at the back of the instrument base, a transverse rib formed with the upper surface of said foot engageable with a depending flange forming a part of the wall structure of said recess, the under surface of said foot having fulcrumed engagement with a bottom wall of said recess, and spring means connected with the lower part of said standard and with a bottom edge of the instrument base, said spring means being biased to rock said standard about its position of fulcrumed engagement with said recess wall to positively maintain said rib in engagement with the depending flange of said recess.

2. In a lamp attachment for cradle-type telephone instruments having a base formed upon its rear side with an undercut hand-holding recess; an arcuately curved standard provided at one end with a lamp-receiving reflector and at its opposite end with a laterally projecting foot for insertion within the recess formed in the rear side of the base of the telephone; a rib formed on the foot of said standard and engageable with a wall of the undercut recess formed in the telephone base to prevent direct outward withdrawal of the foot of said standard from the recess after insertion of said foot therein; and spring means connected at one end with said standard and engageable at its opposite end with the base of the telephone for maintaining said rib in engagement with the said wall of the recess formed in the telephone base.

3. In a lamp attachment for cradle-type telephone instruments having a base formed upon its rear side with an undercut hand-holding recess having therein a depending lip; a curved standard provided at one end with a lamp-receiving reflector and at its opposite end with a laterally projecting foot for insertion within the hand-holding recess of a telephone base, said standard being arranged to extend upwardly and over the base of the telephone instrument when said foot is inserted within the hand-holding recess of the base of the instrument, the foot of said standard being formed with an outwardly projecting rib for engagement with the depending lip provided in the hand-holding recess of the telephone base to prevent direct outward withdrawal of the foot from the recess of the telephone base after insertion of said foot therein, the rib of said foot being arranged to permit insertion and withdrawal of said foot from the recess only when said foot is disposed in angular relation to the recess; and a spring connected with the foot end of said standard and engageable with the lower surface of the telephone base for holding the foot of said standard in a direct outward withdrawal position with respect to the hand-holding recess of the telephone base and for maintaining the rib of said foot in engagement with the depending lip formed in the recess of the telephone base.

ALLEN H. PINKERMAN.

REFERENCES CITED

The following references are of record in the file of this patent:

UNITED STATES PATENTS

| Number | Name | Date |
|---|---|---|
| 1,568,930 | Symmes et al. | Jan. 5, 1926 |
| 1,868,344 | Blum | July 19, 1932 |
| 2,247,591 | Sundee | July 1, 1941 |
| 2,320,838 | Watson | June 1, 1943 |
| 2,442,988 | Satz | June 8, 1948 |